United States Patent [19]
Min

[11] Patent Number: 5,937,271
[45] Date of Patent: Aug. 10, 1999

[54] METHOD FOR MANUFACTURING A THIN FILM ACTUATED MIRROR ARRAY

[75] Inventor: Yong-Ki Min, Seoul, Rep. of Korea

[73] Assignee: Daewoo Electronics Co., Inc., Seoul, Rep. of Korea

[21] Appl. No.: 08/862,246

[22] Filed: May 23, 1997

[51] Int. Cl.[6] .................................................. H01L 21/00
[52] U.S. Cl. ............................ 438/30; 438/29; 350/290; 350/291; 350/310; 350/315; 350/316
[58] Field of Search ........................ 438/29, 30; 359/290, 359/291, 310, 315, 316

[56] References Cited

U.S. PATENT DOCUMENTS

| | | | |
|---|---|---|---|
| 5,768,006 | 6/1998 | Min et al. ................................. | 359/290 |
| 5,859,724 | 1/1999 | Nam ........................................ | 359/295 |

Primary Examiner—Joni Chang
Attorney, Agent, or Firm—Pennie & Edmonds LLP

[57] ABSTRACT

An inventive method for manufacturing an array of M×N thin film actuated mirrors for use in an optical projection system includes the step of: providing a substrate; depositing a thin film sacrificial layer on top of the substrate; creating an array of M×N empty cavities on the thin film sacrificial layer; depositing an elastic layer; patterning the elastic layer into an array of M×N elastic members; forming an array of M×N switching device on the substrate; depositing a passivation layer and an etchant stopping layer; removing the etchant stopping layer and the passivation layer, selectively, such that elastic members are exposed; forming an array of M×N second thin film electrodes and an array of M×N thin film electrodisplacive members, successively, on top of each of elastic members; forming an array of M×N actuating structures; and removing the thin film sacrificial layer to thereby form the array of M×N thin film actuated mirrors. In order to prevent the thermal damage of the active matrix, in inventive method, an array of M×N switching devices are formed on the substrate after all of the high temperature processes are completed, which will, in turn, reduces the possibility of thermal damages occurring on the array of switching devices.

12 Claims, 19 Drawing Sheets

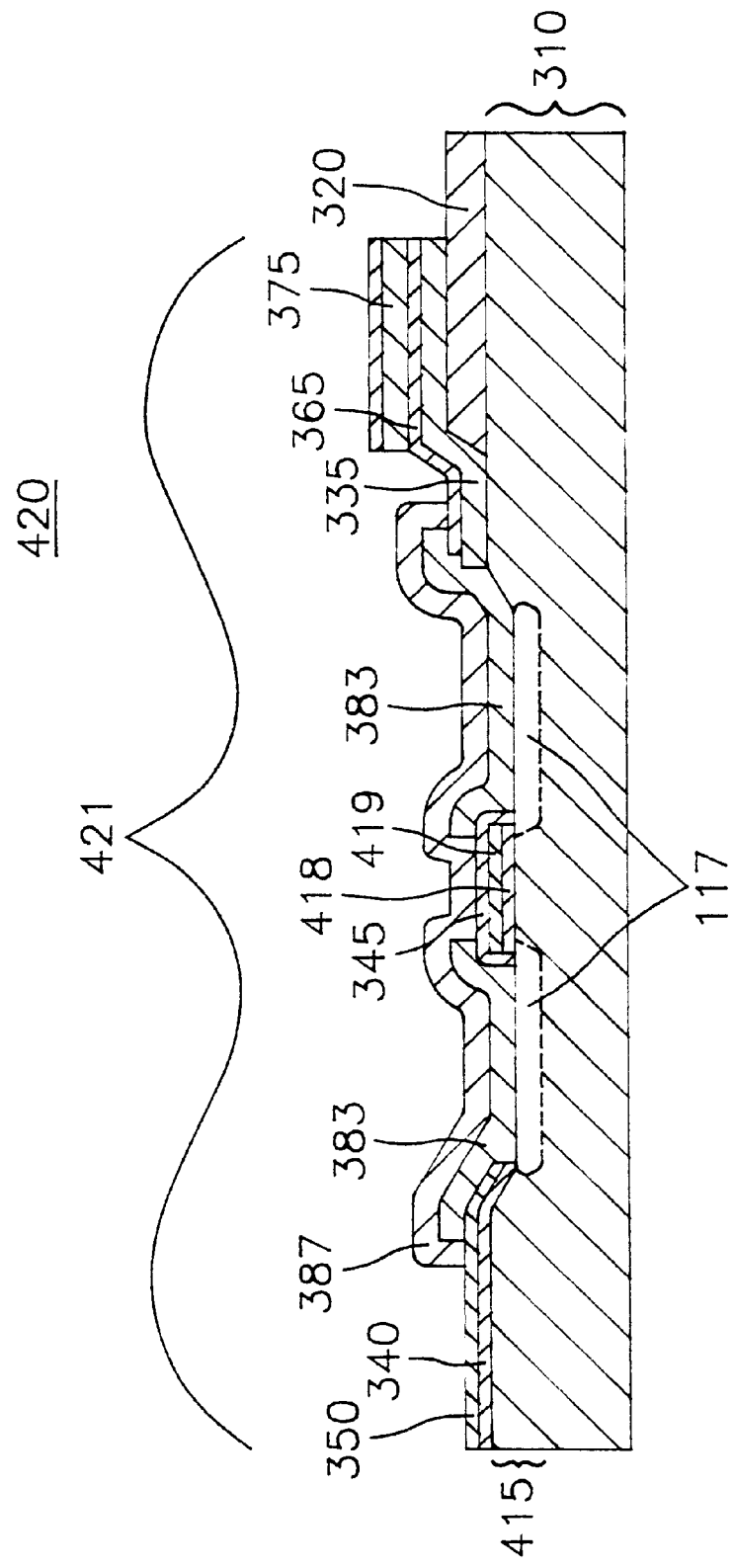

METHOD FOR MANUFACTURING A THIN FILM ACTUATED MIRROR ARRAY

FIELD OF THE INVENTION

The present invention relates to an array of M×N thin film actuated mirrors for use in an optical projection system; and, more particularly, a method for manufacturing thereof which reduces the effects of high temperature processes involved therein.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1I, there are illustrated manufacturing steps involved in manufacturing an array 200 of M×N thin film actuated mirrors 201, wherein M and N are integers, disclosed in a copending commonly owned application, U.S. Ser. No. 08/704,340, entitled "THIN FILM ACTUATED MIRROR ARRAY FOR USE IN AN OPTICAL PROJECTION SYSTEM".

The process for the manufacture of the array 200 begins with the preparation of an active matrix 110 including a substrate 112 with an array of M×N switching devices, e.g., metal-oxide-semiconductor (MOS) transistors 115 and a field oxide layer 116 formed on top thereof. Each of the MOS transistors 115 has a source/drain region 117, a gate oxide layer 118 and a gate electrode 119.

In a subsequent step, there is deposited a first passivation layer 120, made of, e.g., PSG or silicon nitride, and having a thickness of 0.1–2 μm, on top of the active matrix 110 by using, e.g., a CVD or a spin coating method.

Thereafter, an etchant stopping layer 130, made of a nitride, and having a thickness of 0.1–2 μm, is deposited on top of the first passivation layer 120 by using, e.g., a sputtering or a CVD method, as shown in FIG. 1A.

Then, a thin film sacrificial layer 140 is formed on top of the etchant stopping layer 130. The thin film sacrificial layer 140 is formed by using a sputtering or an evaporation method if the thin film sacrificial layer 140 is made of a metal, a CVD or a spin coating method if the thin film sacrificial layer 140 is made of a PSG, or a CVD method if the thin film sacrificial layer 140 is made of a poly-Si.

Subsequently, an array of M×N empty cavities (not shown) is created on the thin film sacrificial layer 140, in such a way that each of the empty cavities encompasses the source/drain region 117 in each of the MOS transistors 115, by using a dry or an wet etching method.

In a next step, an elastic layer 150, made of an insulating material, e.g., silicon nitride, and having a thickness of 0.1–2 μm, is deposited on top of the thin film sacrificial layer 140 including the empty cavities by using a CVD method.

Thereafter, a second thin film layer 160, made of an electrically conducting material, e.g., Pt/Ta, and having a thickness of 0.1–2 μm, is formed on top of the elastic layer 150 by using a sputtering or a vacuum evaporation method. The second thin film layer 160 is then iso-cut in a columnar direction by using an etching method, as shown in FIG. 1B.

Then, a thin film electrodisplacive layer (not shown), made of a piezoelectric material, e.g., PZT, or an electrostrictive material, e.g., PMN, and having a thickness of 0.1–2 μm, is deposited on top of the second thin film layer 160 by using an evaporation, a Sol-Gel, a sputtering or a CVD method.

Next, the thin film electrodisplacive layer is patterned into an array of M×N thin film electrodisplacive members 175 by using a photolithography or a laser trimming method, as shown in FIG. 1C.

In a subsequent step, the second thin film layer 160 and the elastic layer 150 are, respectively, patterned into an array of M×N second thin film electrodes 165 and an array of M×N elastic members 155 by using an etching method, as shown in FIG. 1D.

In an ensuing step, portions of the etchant stopping layer 130 and the first passivation layer 120 formed on top of the source/drain region 117 in each of the MOS transistors 115, are selectively removed, while leaving intact portions 125 thereof surrounding the gate electrode 119 and the gate oxide layer 118 in each of the MOS transistors 115, by using an etching method, as shown in FIG. 1E.

Subsequently, an array of M×N first thin film electrodes 185 and an array of contact members 183 are formed by: first forming a layer (not shown), made of an electrically conducting material, completely covering the above structure, using a sputtering or a vacuum evaporation method; and then selectively removing the layer, using an etching method, as shown in FIG. 1F. Each of the first thin film electrodes 185 is located on top of the thin film electrodisplacive member 175. Each of the contact members 183 is positioned in such a way that it electrically connects the second thin film electrode 165 with the source/drain region 117 in each of the MOS transistors 115.

In a following step, a second passivation layer 187, made of, e.g., PSG or silicon nitride, and having a thickness of 0.1–2 μm, is deposited by using, e.g., a CVD or a spin coating method, and then is patterned in such a way that it completely covers the contact members 183, by using an etching method, thereby forming an array 210 of M×N actuated mirror structures 211, as shown in FIG. 1G.

The preceeding step is then followed by completely covering each of the actuated mirror structures 211 with a first thin film protection layer (not shown).

The thin film sacrificial layer 140 is then removed by using an etching method. Thereafter, the first thin film protection layer is removed, thereby forming an array of M×N actuating structures 100, each of the actuating structures 100 having a proximal and a distal ends (not shown), as shown in FIG. 1H.

In a next step, the array of M×N actuating structures 100 is covered with a sacrificial material, including the spaces formed when the thin film sacrificial layer 140 was removed, in such a way that top of the resulting structure (not shown) is completely flat. Thereafter, an array of M×N empty slots (not shown) is created on the resulting structure by using a photolithography method, each of the empty slots extending from top of the resulting structure to top of the distal end of each of the actuating structures 100.

After the above step, a mirror layer (not shown) made of a light reflecting material, e.g., Al, and a thin film dielectric layer (not shown) are, sequentially, deposited on top of the sacrificial material including the empty slots, and then the mirror layer and the thin film dielectric layer are, respectively, patterned into an array of M×N mirrors 190 and an array of M×N thin film dielectric members 195 by using a photolithography or a laser trimming method, thereby forming an array of M×N semifinished actuated mirrors (not shown), wherein each of the mirrors 190 has a recessed portion 197 which is attached on top of the distal end of the actuating structure 100.

The preceeding step is then followed by completely covering each of the semifinished actuated mirrors with a second thin film protection layer (not shown).

The sacrificial material is then removed by using an etching method. Thereafter, the second thin film protection layer is removed, thereby forming the array 200 of M×N thin film actuated mirrors 201, as shown in FIG. 1I.

There are certain deficiencies associated with the above described method for manufacturing the array 200 of M×N thin film actuated mirrors 201. For example, the method involves a number of high temperature processes, especially during the early stages, e.g., the formation of elastic layer 140 made of a nitride requiring a minimum temperature of 800° C., and the active matrix 110 usually is not able to withstand such a high temperature, resulting in a thermal damage thereof.

SUMMARY OF THE INVENTION

It is, therefore, an object of the present invention to provide a method for the manufacture of an array of M×N thin film actuated mirrors for use in an optical projection system, which reduces the effect of the high temperature processes involved in the manufacture thereof.

In accordance with the present invention, there is provided a method for manufacturing an array of M×N thin film actuated mirrors for use in an optical projection system, the method comprising the steps of: providing a substrate; depositing a thin film sacrificial layer on top of the substrate; creating an array of M×N empty cavities on the thin film sacrificial layer; depositing an elastic layer on top of the thin film sacrificial layer including the empty cavities; patterning the elastic layer into an array of M×N elastic members; forming an array of M×N switching device on the substrate; depositing a passivation layer and an etchant stopping layer on top of each of elastic members and switching devices; removing the etchant stopping layer and the passivation layer, selectively, such that elastic members are exposed; forming an array of M×N second thin film electrodes and an array of M×N thin film electrodisplacive members, successively, on top of each of elastic members; forming an array of M×N first thin film electrodes and an array of contact members; removing the thin film sacrificial layer, thereby forming an array of M×N actuating structures; covering the array of M×N actuating structures with a sacrificial material; depositing a mirror layer on top of the sacrificial material; patterning the mirror layer into an array of M×N mirrors; and removing the sacrificial material, thereby forming the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIGS. 2A to 2J provide schematic cross section views setting forth a method for the manufacture of the array of M×N thin film actuated mirrors in accordance with the present invention.

DETAILED DESCRIPTION OF THE PREFERRED EMBODIMENTS

Figure 1A:
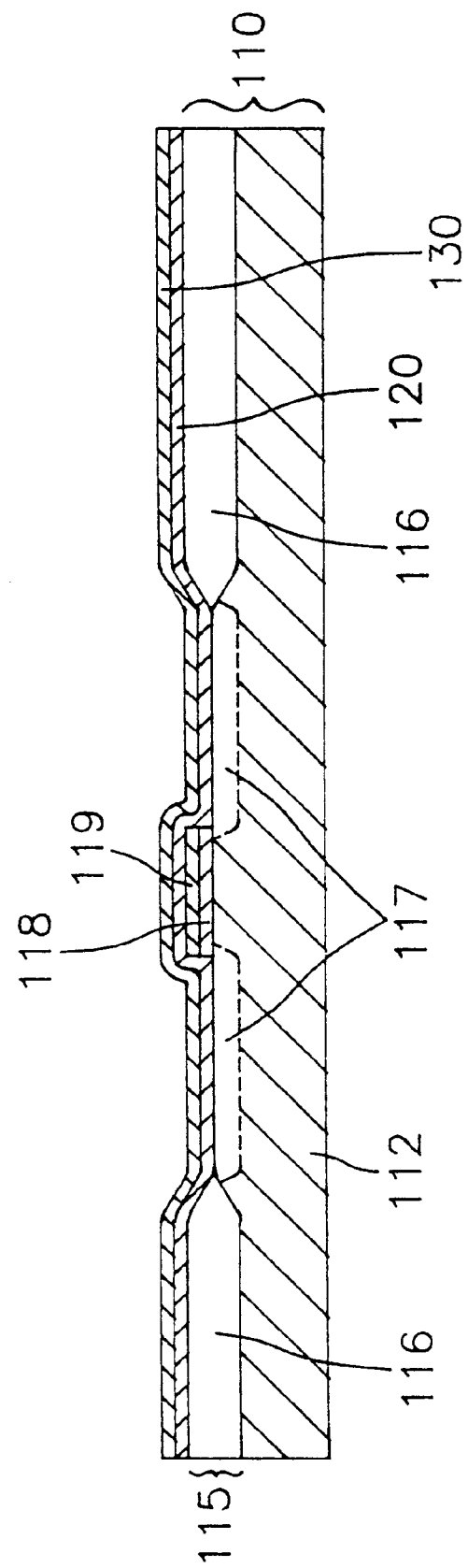
FIGS. 1A to 1I present schematic cross sectional views illustrating a method for the manufacture of an array of M×N thin film actuated mirrors previously disclosed.
Figure 1B:
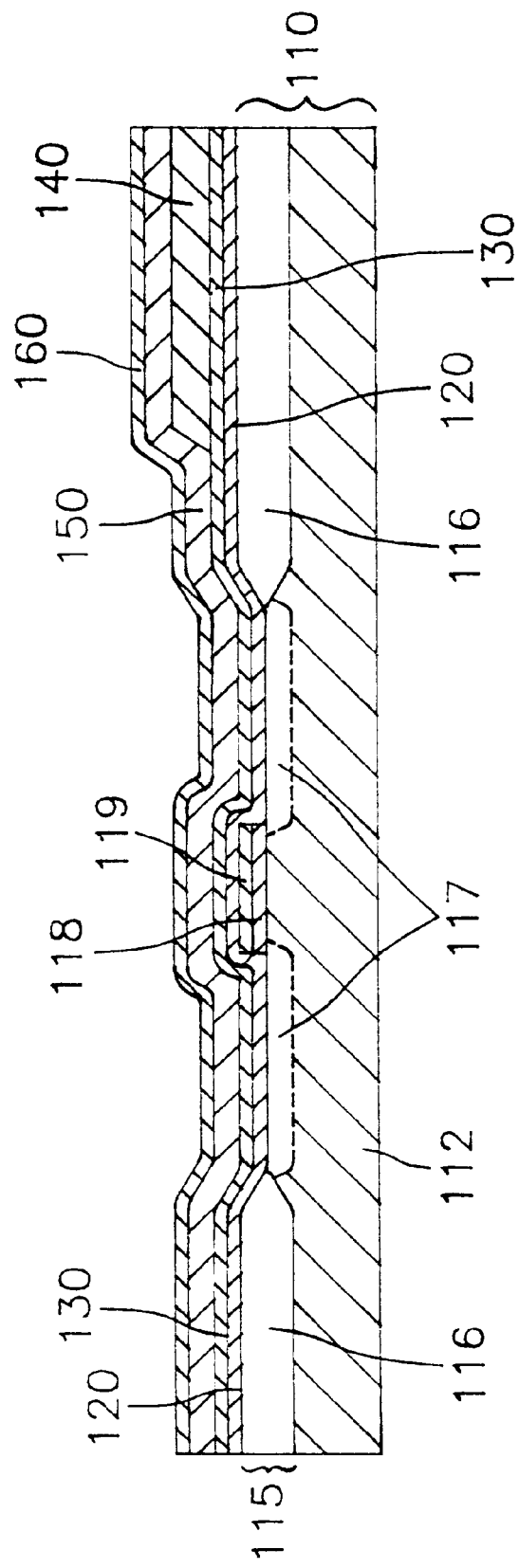
Figure 1C:
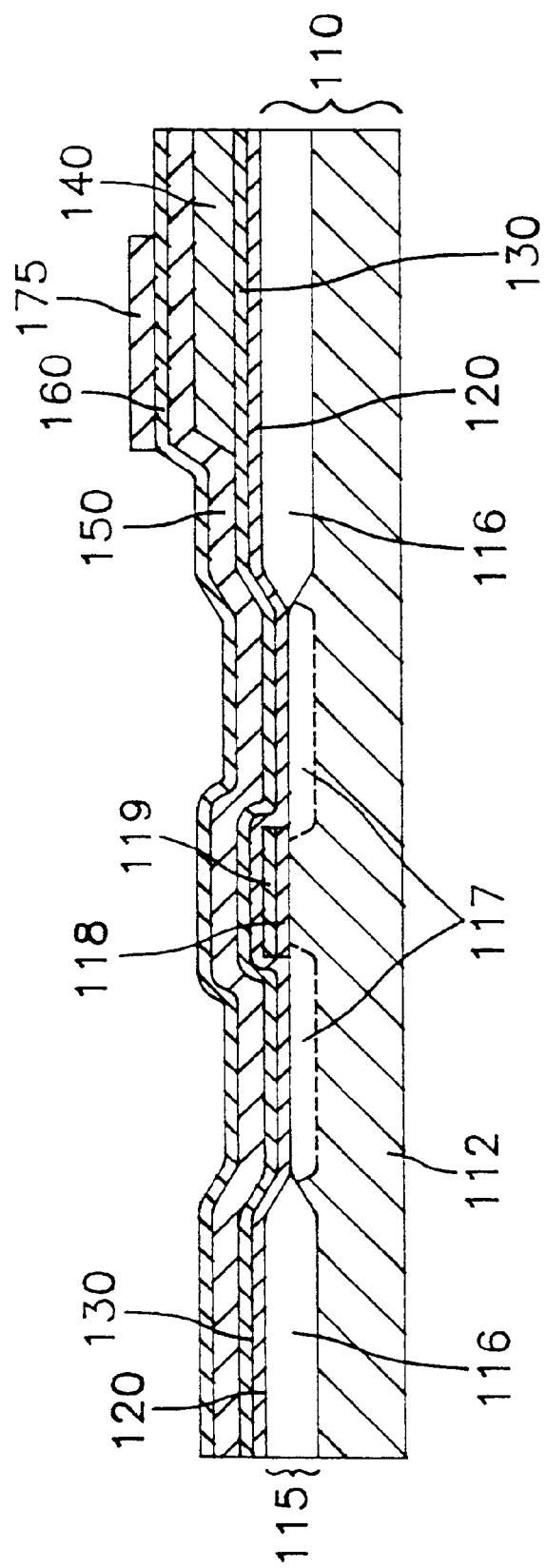
Figure 1D:
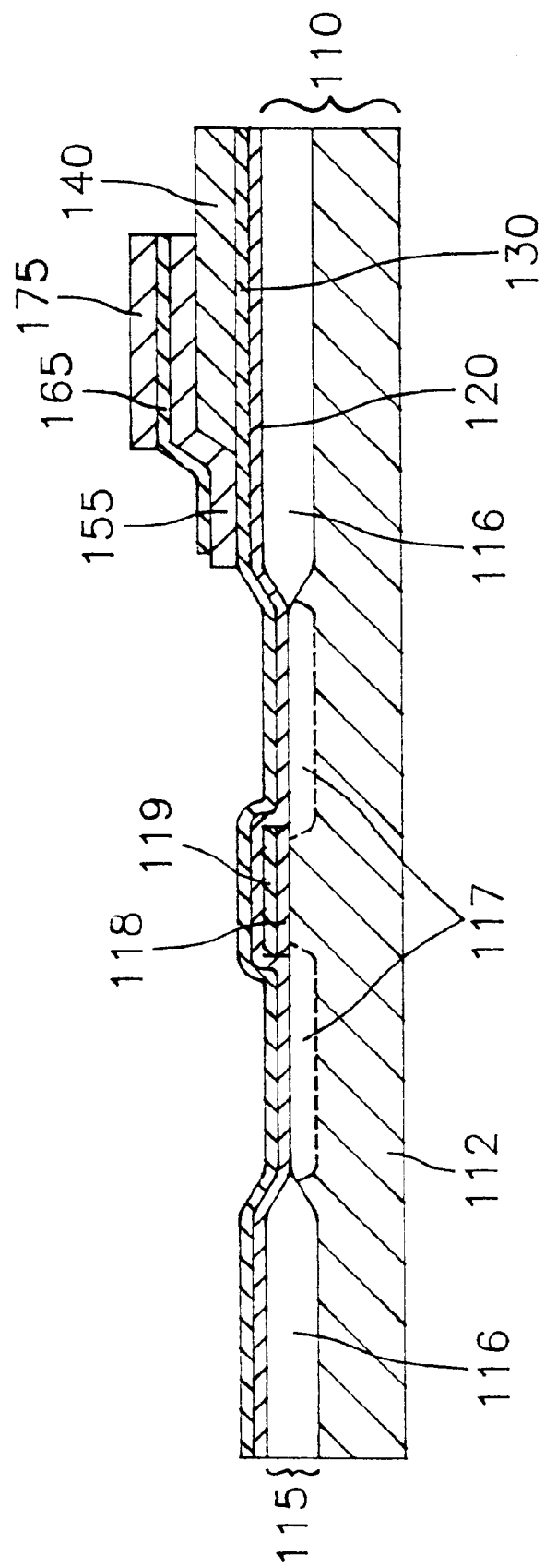
Figure 1E:
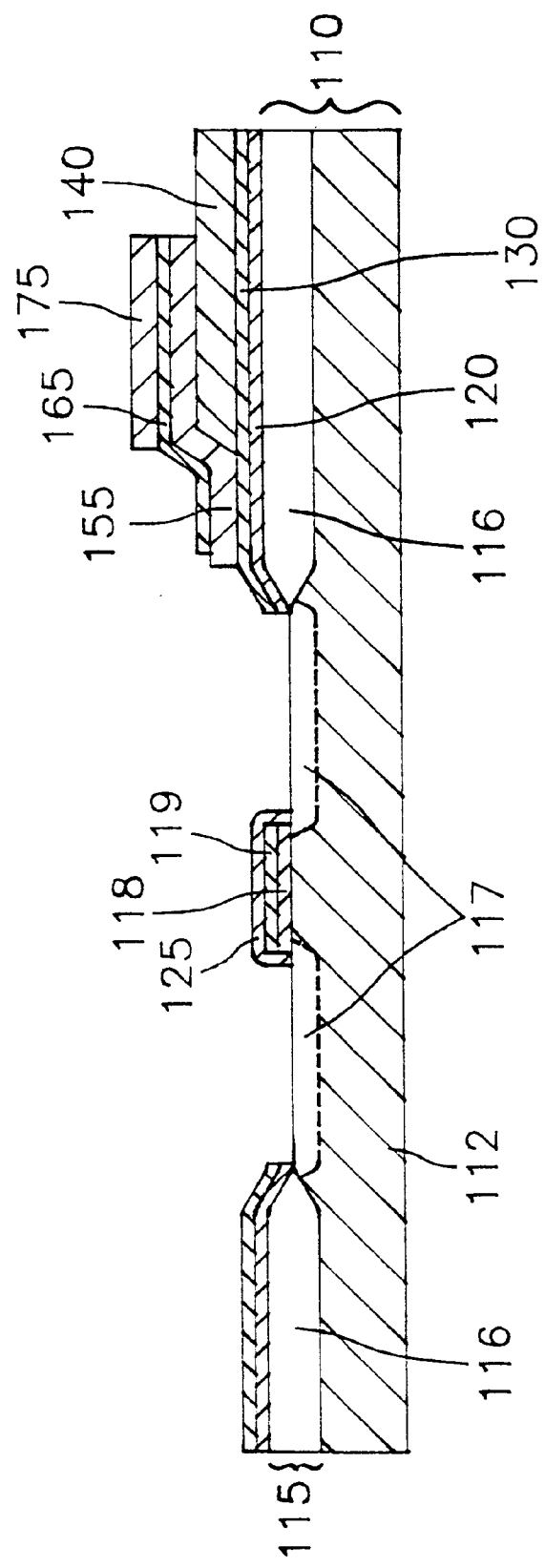
Figure 1F:
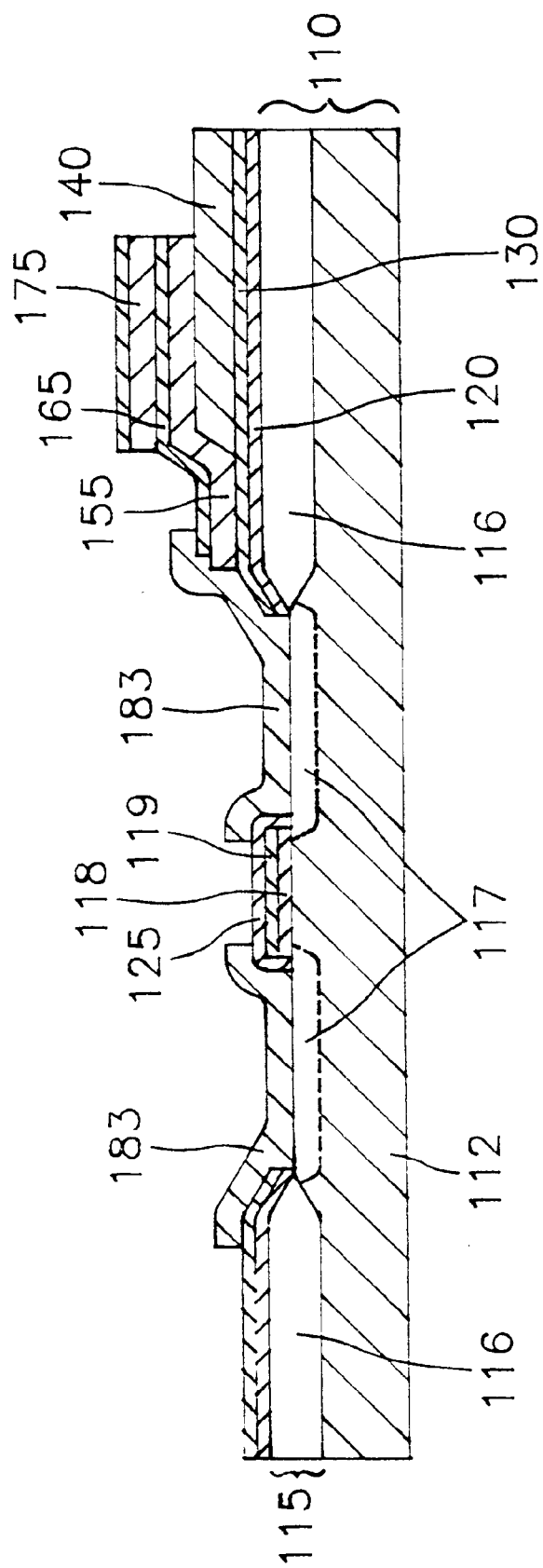
Figure 1G:
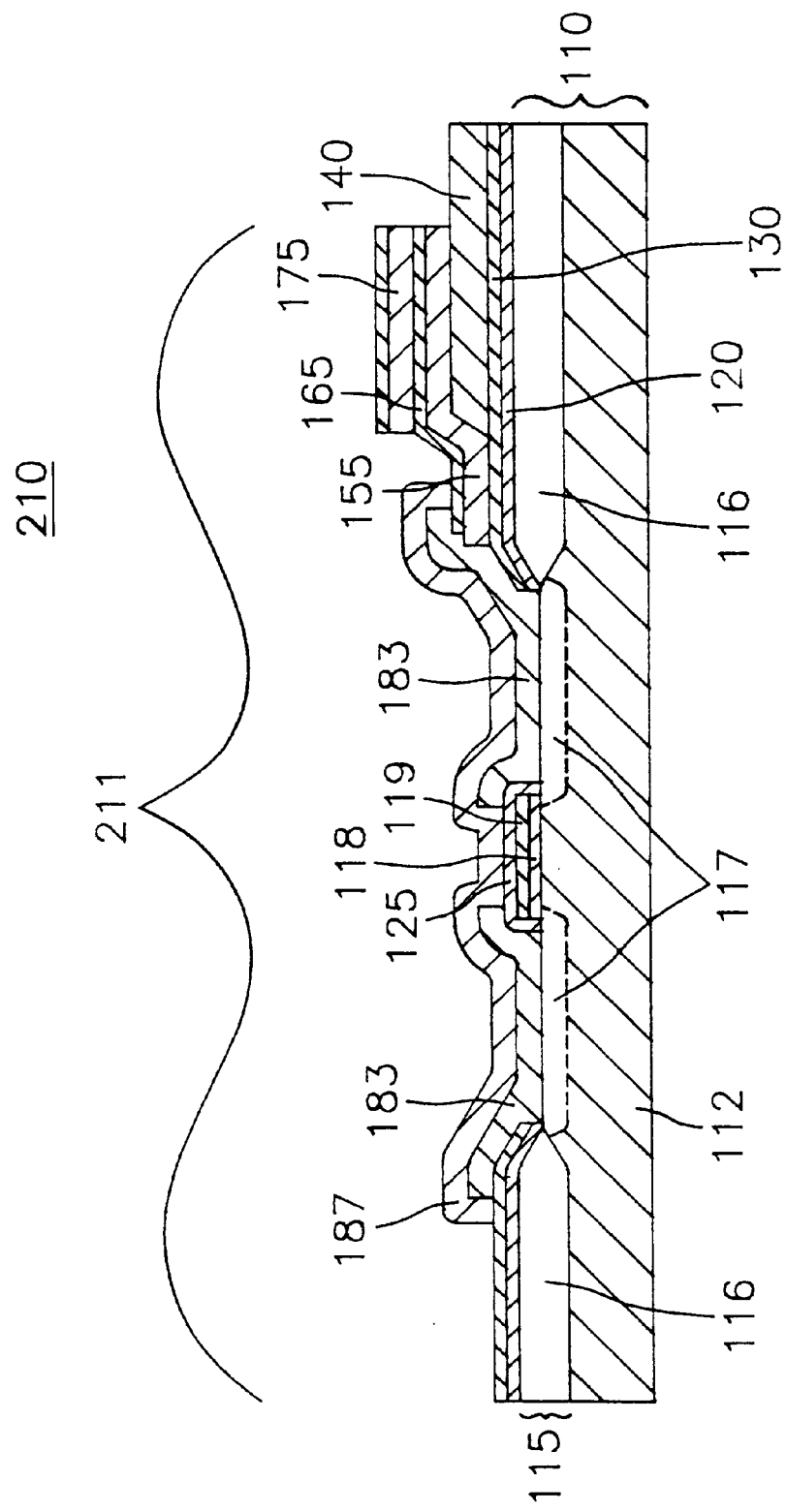
Figure 1H:
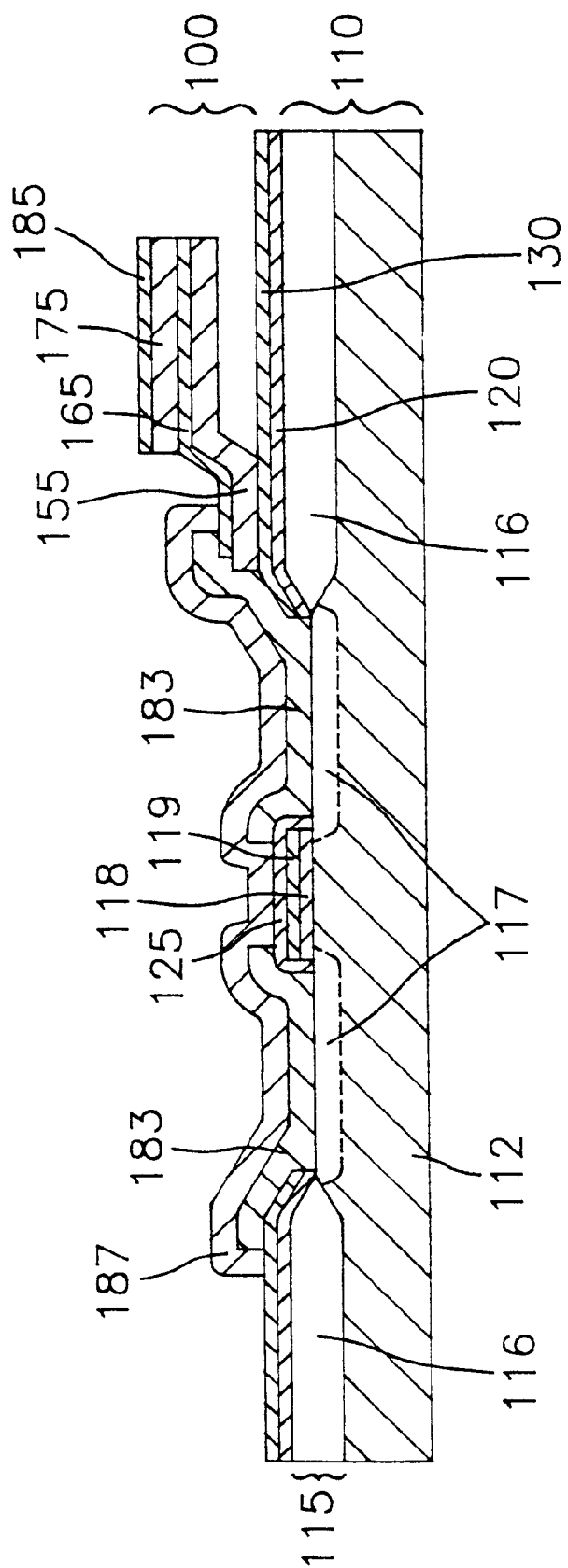
Figure 1I:
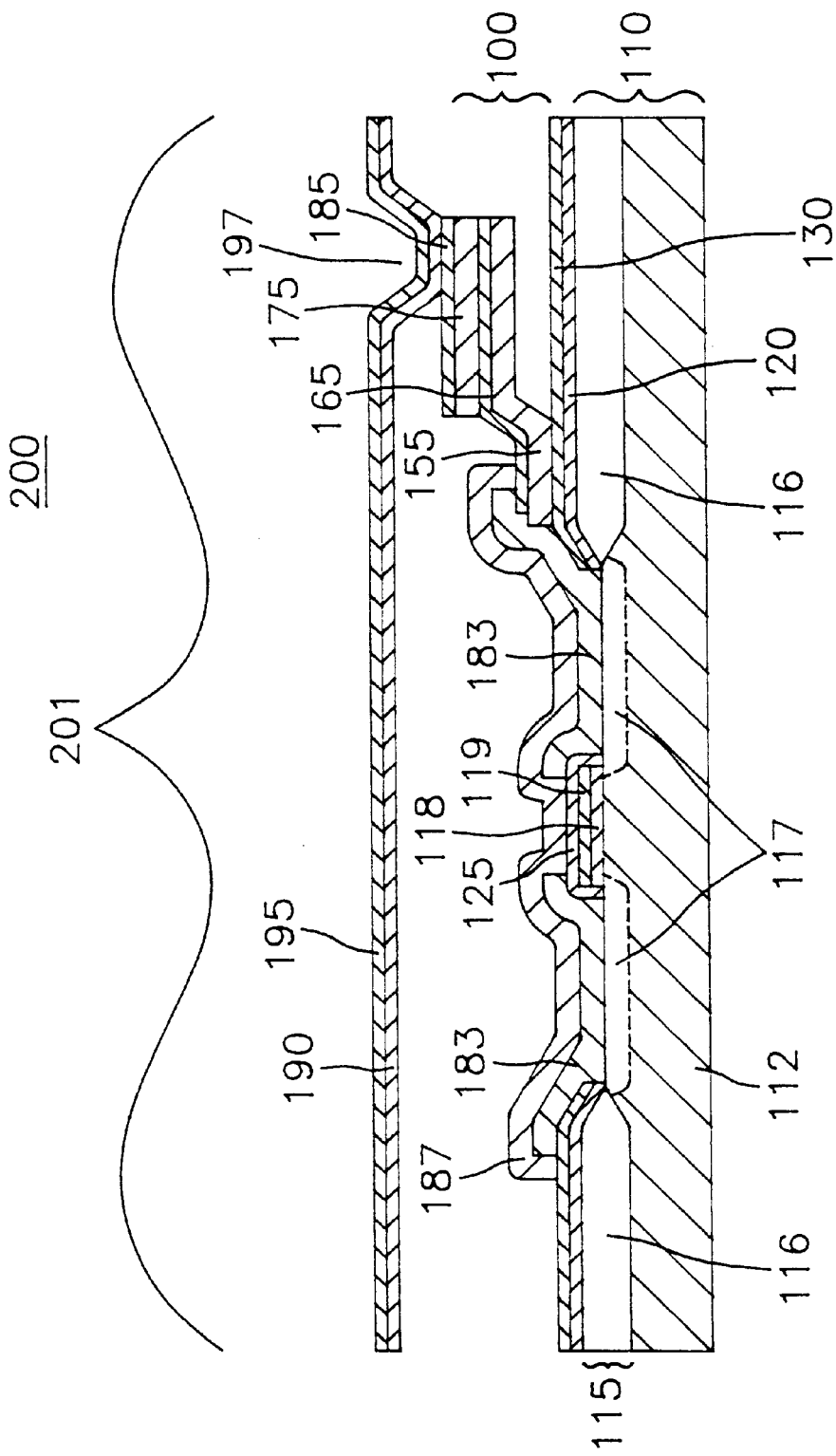

There are provided in FIGS. 2A to 2J schematic cross sectional views illustrating a method for the manufacture of an array 400 of M×N thin film actuated mirrors 401, wherein M and N are integers, for use in an optical projection system in accordance with the present invention. It should be noted that like parts appearing in FIGS. 2A to 2J are represented by like reference numerals.

The process for the manufacture of the array 400 begins with the preparation of a substrate 310 made of an insulating material, e.g, Si-wafer.

In a subsequent step, a thin film sacrificial layer 320 is formed on top of the substrate 310. The thin film sacrificial layer 320 is formed by using a sputtering or an evaporation method if the thin film sacrificial layer 320 is made of a metal, a CVD or a spin coating method if the thin film sacrificial layer 320 is made of a PSG, or a CVD method if the thin film sacrificial layer 320 is made of a poly-Si.

Figure 2A:
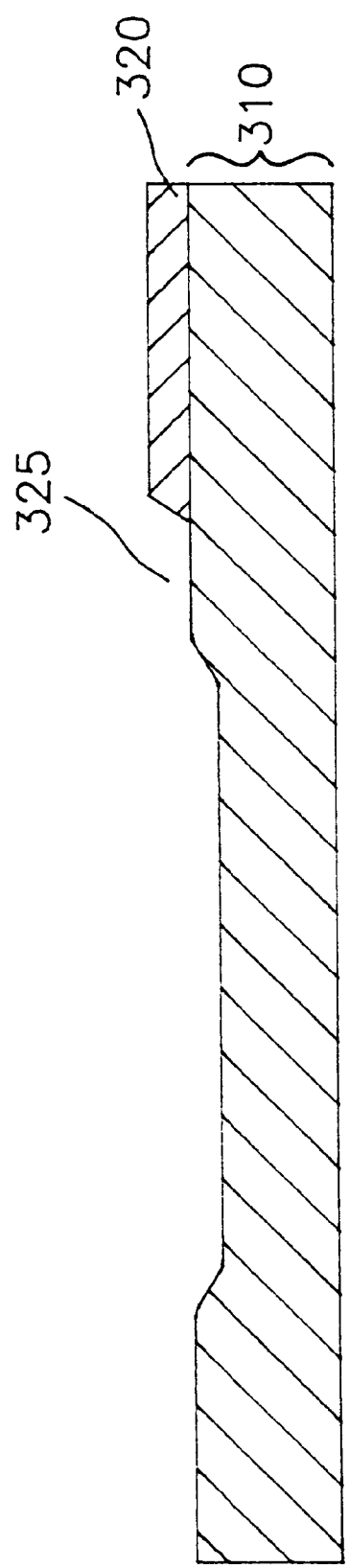

Subsequently, an array of M×N empty cavities 325 is created on the thin film sacrificial layer 320, by using a dry or an wet etching method, as shown in FIG. 2A.

In a next step, an elastic layer (not shown), made of an insulating material, e.g., nitride, and having a thickness of 0.1–2 μm, is deposited on top of the thin film sacrificial layer 320 including the empty cavities 325 by using a CVD method.

Figure 2B:
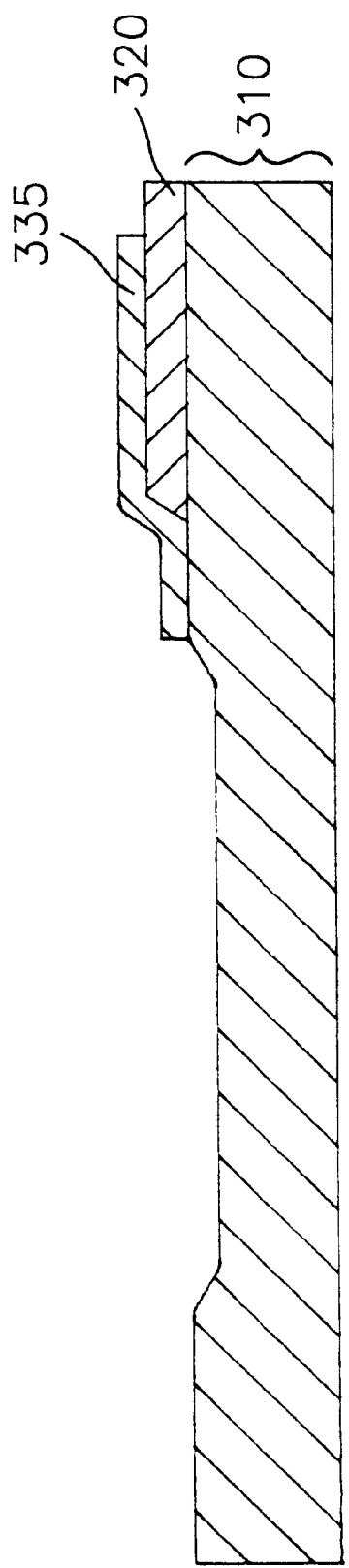

In a ensuing step, the elastic layer is patterned into an array of M×N elastic member 335 by using an etching method in high temperature, e.g., 800° C., as shown in FIG. 2B.

Figure 2C:
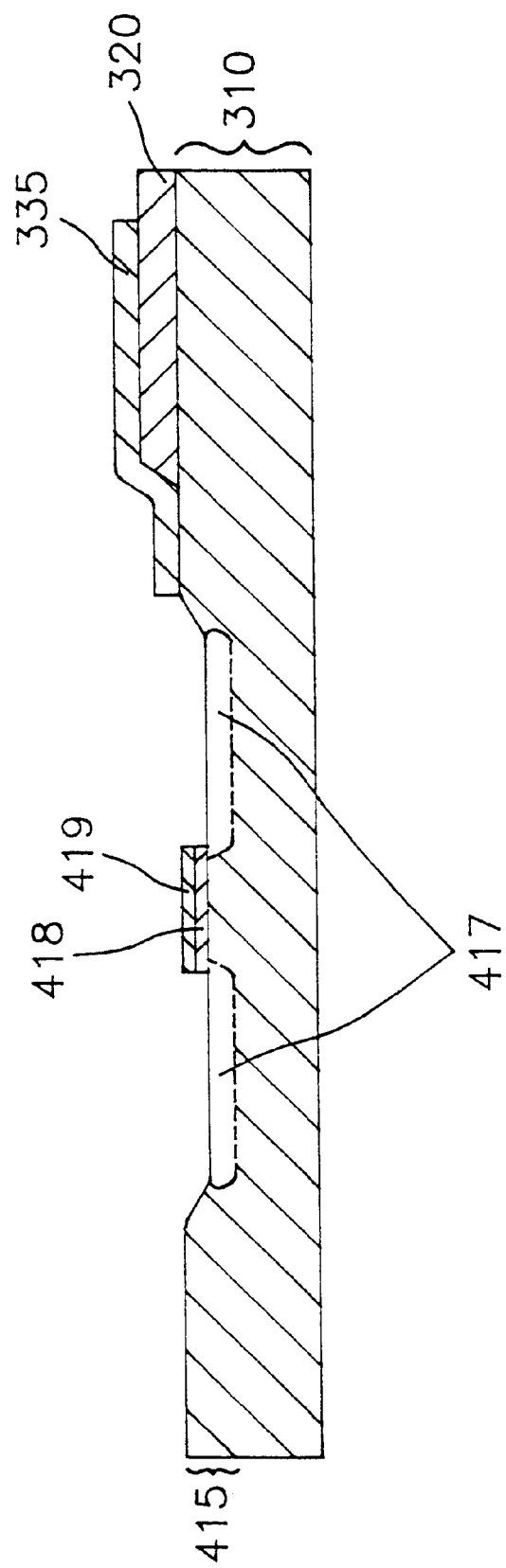

Thereafter, an array of M×N switching devices 415, e.g., metal-oxide-semiconductor (MOS) transistor, is formed on the substrate 310. Each of the MOS transistors 415 has a source/drain region 417, a gate oxide layer 418 and a gate electrode 419 and is located between two successive elastic members 335 in a same row or column, as shown in FIG. 2C.

In a subsequent step, there is deposited a first passivation layer 340, made of, e.g., PSG or silicon nitride, and having a thickness of 0.1–2 μm, on top of each of elastic members 335 and switching devices 415 by using, e.g., a CVD or a spin coating method.

Figure 2D:
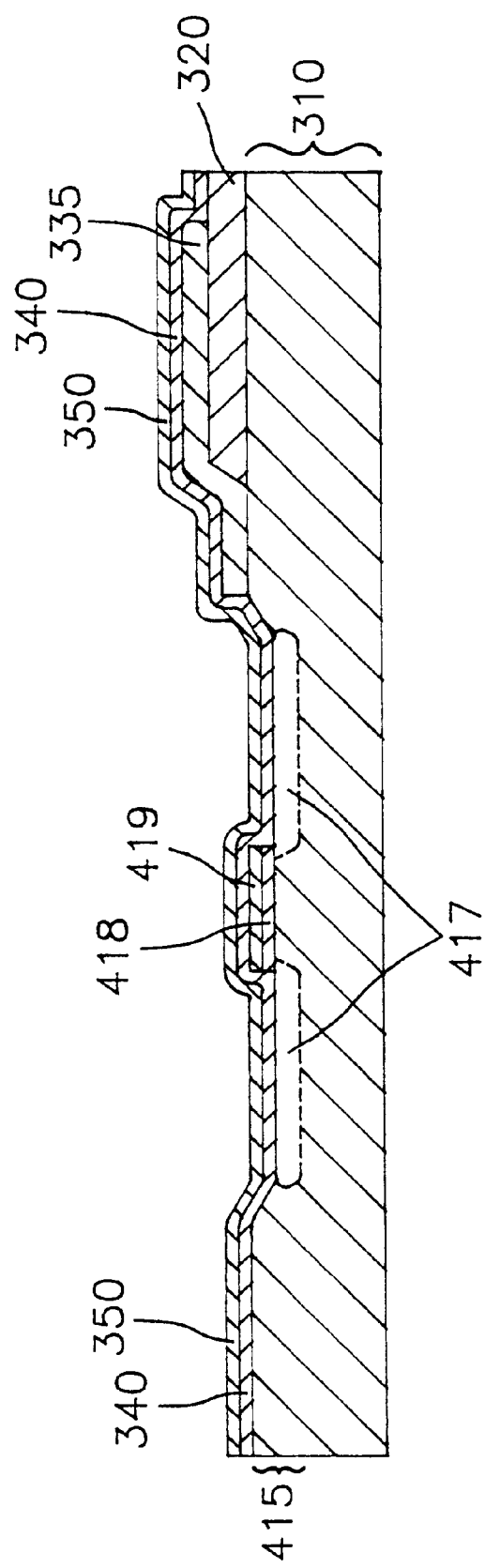

Thereafter, an etchant stopping layer 350, made of a nitride, and having a thickness of 0.1–2 μm, is deposited on top of the first passivation layer 340 by using, e.g., a sputtering or a CVD method, as shown in FIG. 2D.

Figure 2E:
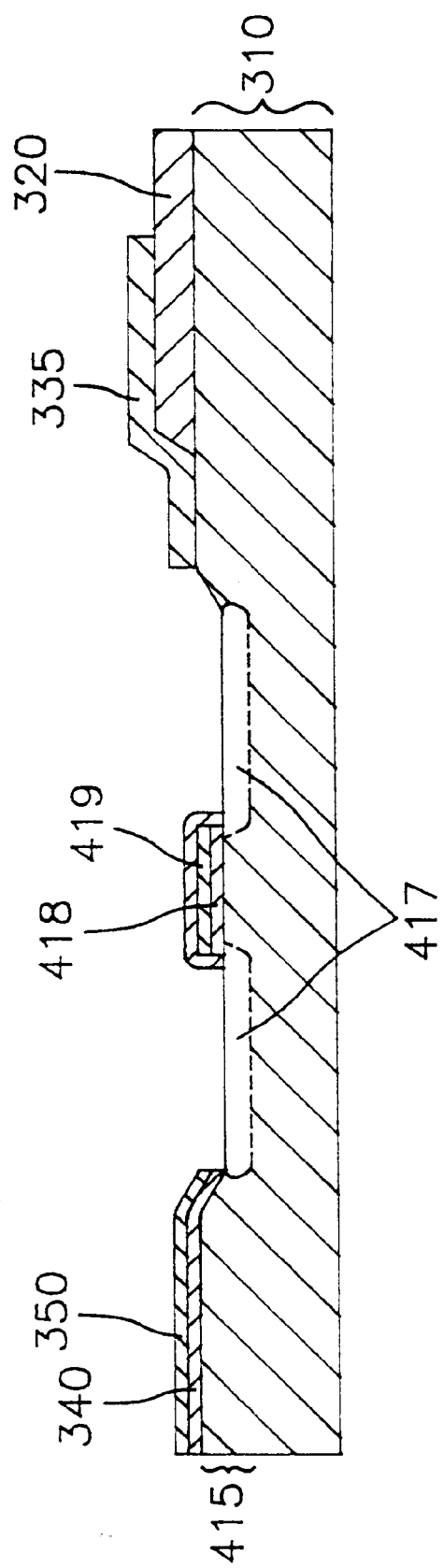

Subsequently, portions of the etchant stopping layer 350 and the first passivation layer 340 are selectively removed, while leaving intact portions 345, by using an etching method, as shown in FIG. 2E.

In a next step, a second thin film layer (not shown), made of an electrically conducting material, e.g., Pt/Ta, and having a thickness of 0.1–2 µm, is formed on top of each of elastic members 355 by using a sputtering or a vacuum evaporation method. The second thin film layer is then iso-cut in a columnar direction by using an etching method.

Then, a thin film electrodisplacive layer (not shown), made of a piezoelectric material, e.g., PZT, or an electrostrictive material, e.g., PMN, and having a thickness of 0.1–2 µm, is deposited on top of the second thin film layer by using an evaporation, a Sol-Gel, a sputtering or a CVD method.

Figure 2F:
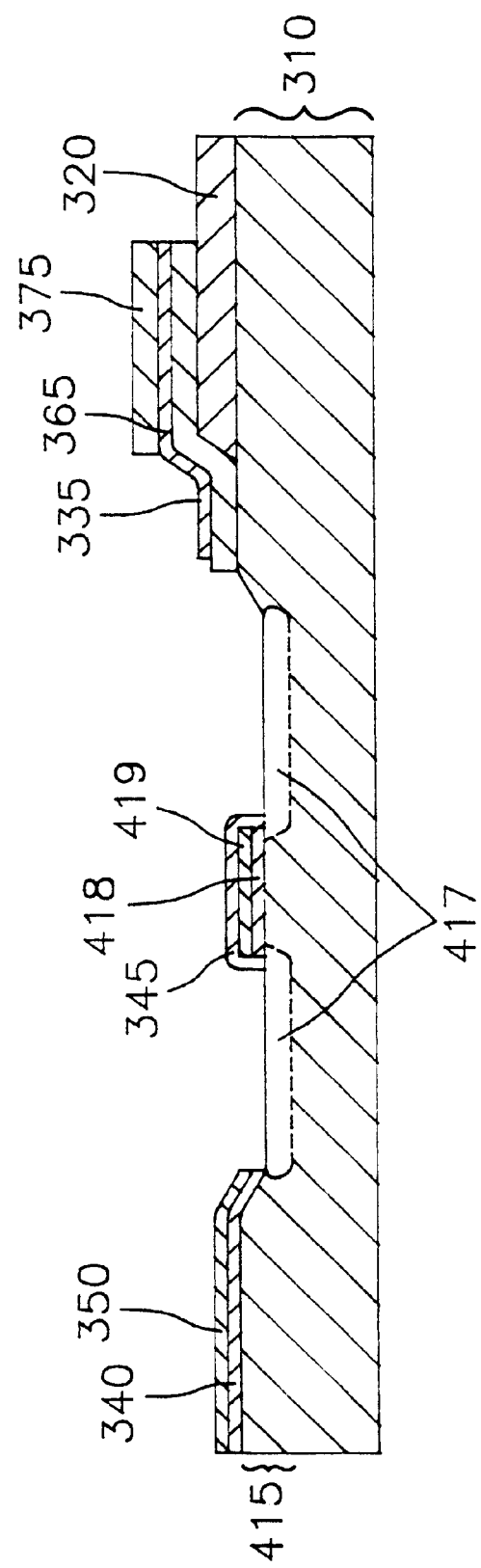

Next, the thin film electrodisplacive layer and the second thin film layer are, respectively, patterned into an array of M×N thin film electrodisplacive members 375 and an array of M×N second thin film electrodes 365 by using a photolithography or a laser trimming method, as shown in FIG. 2F.

Figure 2G:
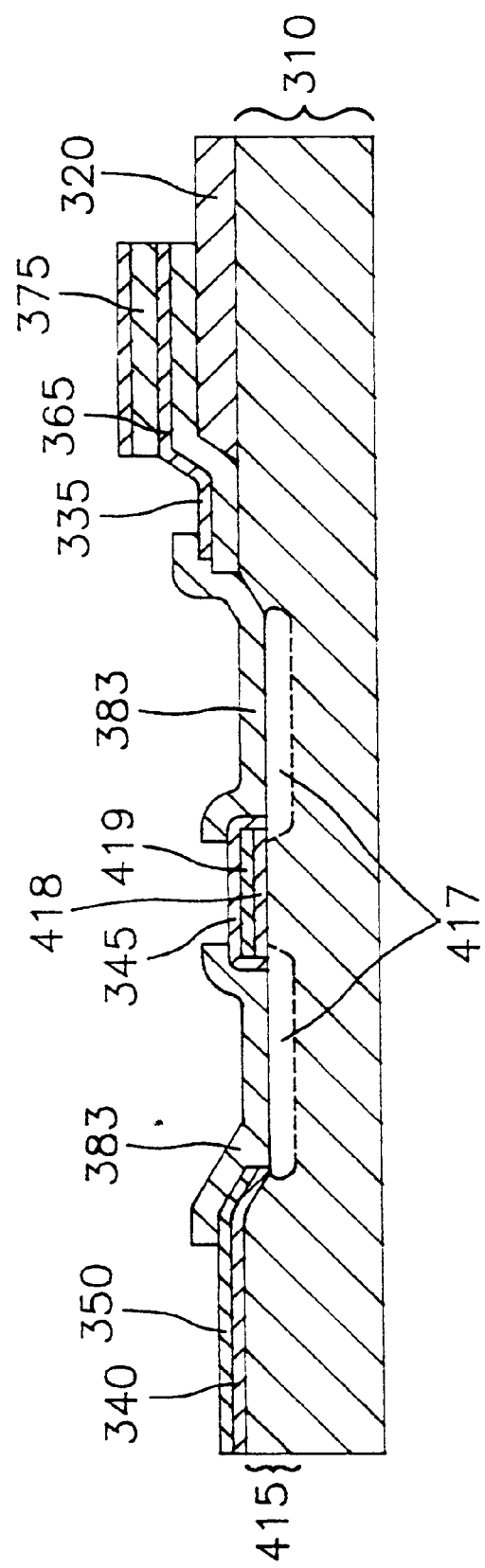

Subsequently, an array of M×N first thin film electrodes 385 and an array of contact members 383 are formed by: first forming a layer (not shown), made of an electrically conducting material, completely covering the above structure, using a sputtering or a vacuum evaporation method; and then selectively removing the layer, using an etching method, as shown in FIG. 2G. Each of the first thin film electrodes 385 is located on top of the thin film electrodisplacive member 375. Each of the contact members 383 is positioned in such a way that it electrically connects the second thin film electrode 365 with the source/drain region 417 in each of the MOS transistors 415.

In a following step, a second passivation layer 387, made of, e.g., PSG or silicon nitride, and having a thickness of 0.1–2 µm, is deposited by using, e.g., a CVD or a spin coating method, and then is patterned in such a way that it completely covers the contact members 383, by using an etching method, thereby forming an array 420 of M×N actuated mirror structures 421, as shown in FIG. 2H.

The preceeding step is then followed by completely covering each of the actuated mirror structures 421 with a first thin film protection layer (not shown).

Figure 2I:
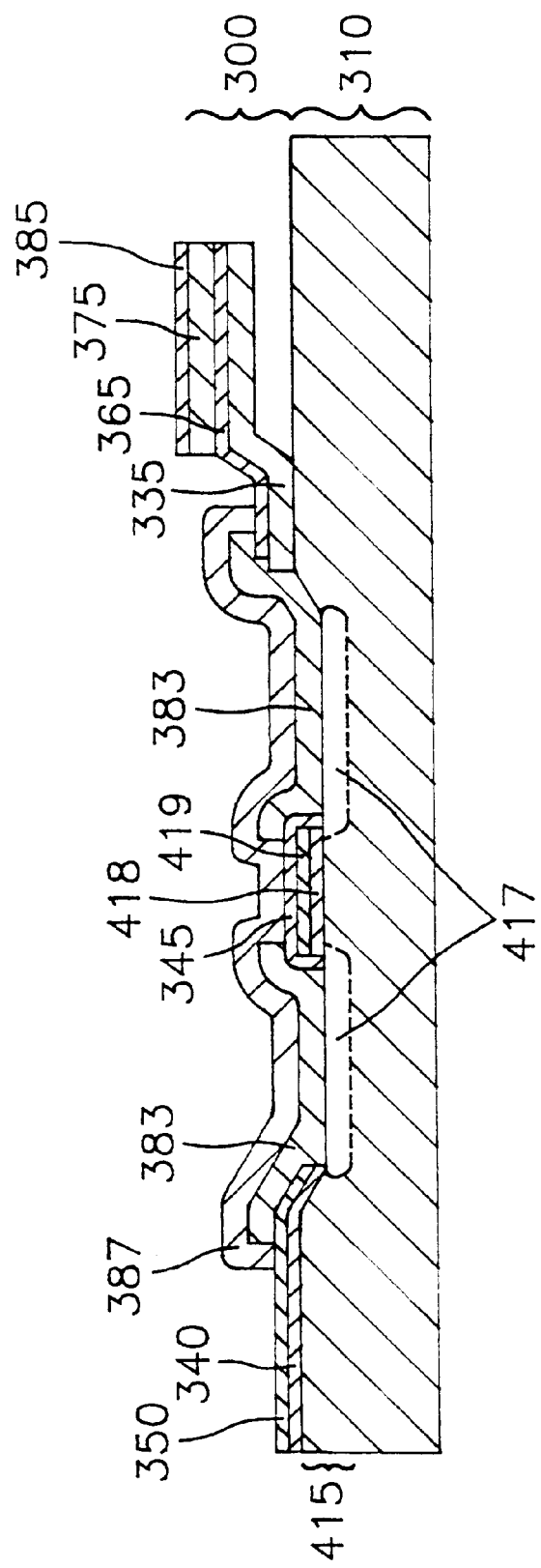

The thin film sacrificial layer 320 is then removed by using an etching method. Thereafter, the first thin film protection layer is removed, thereby forming an array of M×N actuating structures 300, each of the actuating structures 300 having a proximal and a distal ends (not shown), as shown in FIG. 2I.

In a next step, the array of M×N actuating structures 300 is covered with a sacrificial material, including the spaces formed when the thin film sacrificial layer 320 was removed, in such a way that top of the resulting structure (not shown) is completely flat. Thereafter, an array of M×N empty slots (not shown) is created on the resulting structure by using a photolithography method, each of the empty slots extending from top of the resulting structure to top of the distal end of each of the actuating structures 300.

After the above step, a mirror layer (not shown) made of a light reflecting material, e.g., Al, and a thin film dielectric layer (not shown) are, sequentially, deposited on top of the sacrificial material including the empty slots, and then the mirror layer and the thin film dielectric layer are, respectively, patterned into an array of M×N mirrors 390 and an array of M×N thin film dielectric members 395 by using a photolithography or a laser trimming method, thereby forming an array of M×N semifinished actuated mirrors (not shown), wherein each of the mirrors 390 has a recessed portion 397 which is attached on top of the distal end of the actuating structure 300.

The preceeding step is then followed by completely covering each of the semifinished actuated mirrors with a second thin film protection layer (not shown).

Figure 2J:
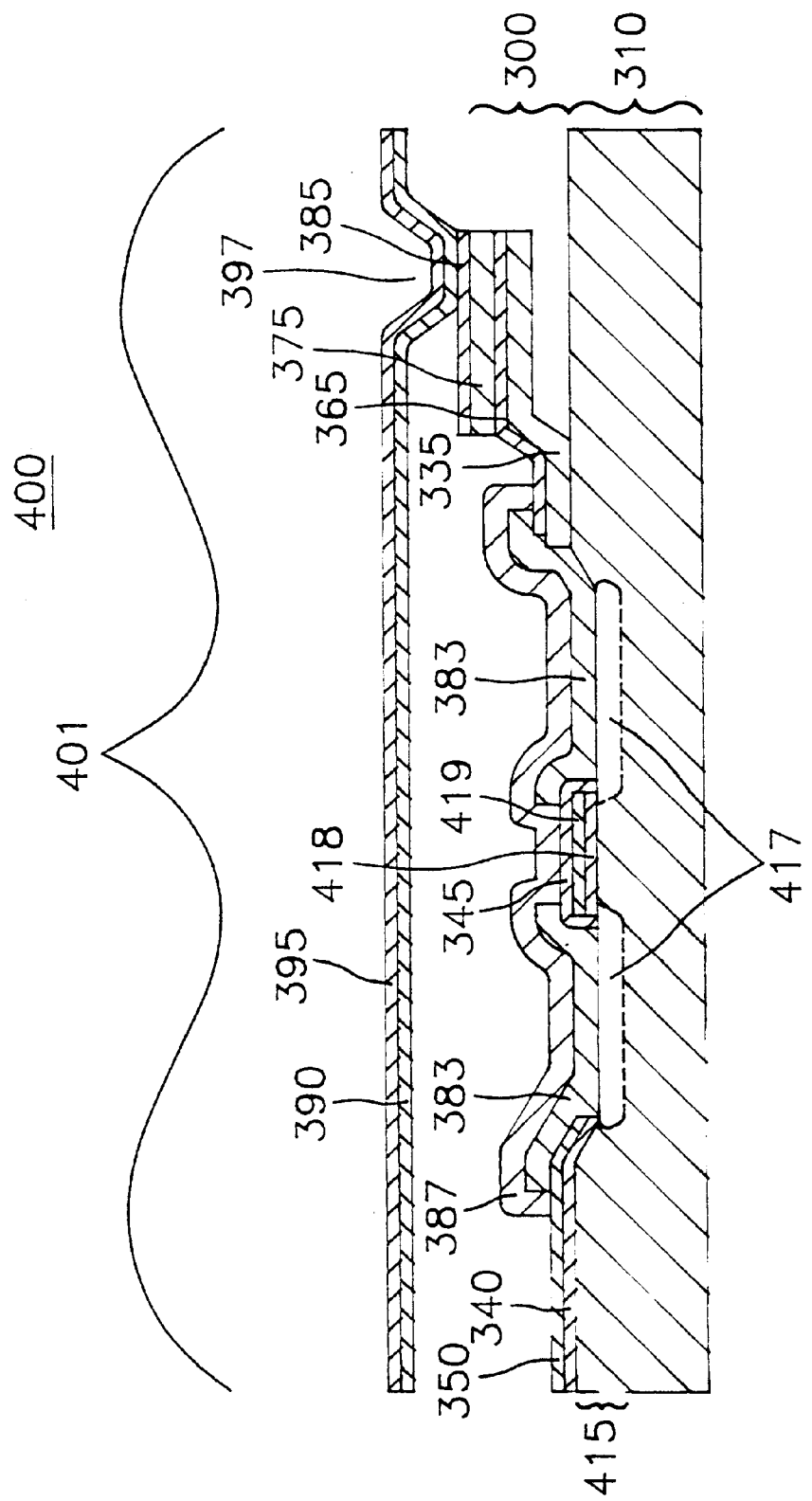

The sacrificial material is then removed by using an etching method. Thereafter, the second thin film protection layer is removed, thereby forming the array 400 of M×N thin film actuated mirrors 401, as shown in FIG. 2J.

In contrast with the previously disclosed method for forming the array of M×N thin film actuated mirrors, in the inventive method, an array of M×N switching devices 415 are formed on the substrate 310 after all of the high temperature processes are completed, which will, in turn, reduces the possibility of thermal damages occurring on the array of switching devices 415.

While the present invention has been described with respect to certain preferred embodiments only, other modifications and variations may be made without departing from the spirit and scope of the present invention as set forth in the following claims.

What is claimed is:

1. A method for manufacturing an array of M×N thin film actuated mirrors for use in an optical projection system, the method comprising the steps of:

providing a substrate;

depositing a thin film sacrificial layer on top of the substrate;

creating an array of M×N empty cavities on the thin film sacrificial layer;

depositing an elastic layer on top of the thin film sacrificial layer including the empty cavities;

patterning the elastic layer into an array of M×N elastic members;

forming an array of M×N switching device on the substrate;

depositing a passivation layer and an etchant stopping layer on top of each of elastic members and switching devices;

removing the etchant stopping layer and the passivation layer, selectively, such that elastic members are exposed;

forming an array of M×N second thin film electrodes and an array of M×N thin film electrodisplacive members on top of each of elastic members;

forming an array of M×N first thin film electrodes and an array of contact members;

removing the thin film sacrificial layer, thereby forming an array of M×N actuating structures;

covering the array of M×N actuating structures with a sacrificial material;

depositing a mirror layer on top of the sacrificial material;

patterning the mirror layer into an array of M×N mirrors; and removing the sacrificial material, thereby forming the array of M×N thin film actuated mirrors.

2. The method of claim 1, wherein the substrate is made of an insulating material.

3. The method of claim 2, wherein the substrate is a silicon wafer.

4. The method of claim 1, wherein each of the switching devices is a metal-oxide-semiconductor (MOS) transistor.

5. The method of claim 1, wherein each of the switching devices is located between two successive elastic members in a same row or column.

6. The method of claim 1, which further comprises a step for forming a thin film dielectric member on top of each of the mirrors after the deposition of the mirror layer.

7. A method for manufacturing an array of M×N thin film actuated mirrors for use in an optical projection system, wherein the array of M×N thin film actuated mirrors includes an active matrix having a substrate with an array of M×N switching devices formed thereon, an array of M×N thin film actuating structures formed on the substrate including at least two electrodes, an electrodisplacive member disposed between the two electrodes and an elastic member, and a mirror for reflecting light beams incident thereupon, the method initially involving a series of high temperature thin film processes, low temperature thin film processes and patterning processes, the method further being characterized in that:

said array of switching devices is formed on the substrate after all of the high temperature processes involved in forming the actuating structures have been completed.

8. The method of claim 7, wherein the high temperature thin film processes involve a minimum temperature of 800° C.

9. The method of claim 7, wherein the high temperature thin film processes in conjunction with the patterning processes are used for forming the elastic member.

10. The method of claim 9, wherein the elastic member is made of a nitride.

11. The method of claim 10, wherein the elastic member is formed by using a CVD method.

12. The method of claim 7, wherein the low temperature thin film processes and the patterning processes are used for forming the electrodes and the electrodisplacive member.

* * * * *